(12) United States Patent
Houck (10) Patent No.: US 11,624,656 B2
(45) Date of Patent: Apr. 11, 2023

(54) OPTICAL FILTER FOR AN OPTICAL SENSOR DEVICE

(71) Applicant: VIAVI Solutions Inc., San Jose, CA (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 61 days.

(21) Appl. No.: 17/228,068

(22) Filed: Apr. 12, 2021

(65) Prior Publication Data
US 2022/0326081 A1 Oct. 13, 2022

(51) Int. Cl.
*G01J 3/51* (2006.01)
*G01J 3/12* (2006.01)

(52) U.S. Cl.
CPC ............. *G01J 3/513* (2013.01); *G01J 3/12* (2013.01); *G01J 2003/1239* (2013.01)

(58) Field of Classification Search
CPC ....... G01J 3/513; G01J 3/12; G01J 2003/1239
See application file for complete search history.

(56) References Cited

U.S. PATENT DOCUMENTS

| | | | | |
|---|---|---|---|---|
| 8,441,562 B1 * | 5/2013 | Szedo | ................. | H04N 17/002 |
| | | | | 348/280 |
| 2007/0159542 A1 * | 7/2007 | Luo | .................... | H04N 9/04557 |
| | | | | 348/E9.01 |
| 2010/0321522 A1 | 12/2010 | Seto | | |
| 2013/0057753 A1 * | 3/2013 | Gillet | ................. | H04N 9/04519 |
| | | | | 348/E5.045 |
| 2013/0308045 A1 * | 11/2013 | Rhoads | ................ | H04N 5/2256 |
| | | | | 348/371 |
| 2014/0168421 A1 * | 6/2014 | Xu | ........................ | G06V 40/103 |
| | | | | 348/135 |
| 2014/0293091 A1 * | 10/2014 | Rhoads | ..................... | G01J 3/51 |
| | | | | 348/234 |

(Continued)

FOREIGN PATENT DOCUMENTS

CN 111565305 A 8/2020

OTHER PUBLICATIONS

International Search Report and Written Opinion for Application No. PCT/US2022/071662, dated Jun. 24, 2022, 11 pages.

*Primary Examiner* — Jamil Ahmed
(74) *Attorney, Agent, or Firm* — Harrity & Harrity, LLP (57) ABSTRACT

An optical sensor device, includes an optical sensor that has a set of sensor elements, an optical filter that includes a plurality of regions, and one or more processors. A region, of the plurality of regions, includes a first set of optical channels comprising optical channels that are configured to pass light associated with respective subranges of a first wavelength range, a second set of optical channels comprising optical channels that are configured to pass light associated with respective subranges of a second wavelength range, and a third set of optical channels comprising optical channels that are configured to pass light associated with respective subranges of a third wavelength range. The one or more processors are configured to obtain, from the optical sensor, sensor data associated with a scene and determine image information associated with the scene based on the spectral information.

20 Claims, 8 Drawing Sheets

(56) References Cited

U.S. PATENT DOCUMENTS

| | | | |
|---|---|---|---|
| 2015/0077617 A1* | 3/2015 | Komiya | H04N 5/2358 |
| | | | 348/336 |
| 2017/0058343 A1* | 3/2017 | Quintel | C12Q 1/6869 |
| 2017/0142386 A1* | 5/2017 | Richards | H04N 9/04559 |
| 2017/0171476 A1* | 6/2017 | Katzir | G02B 26/001 |
| 2018/0097992 A1* | 4/2018 | Douady-Pleven | G06T 5/004 |

* cited by examiner

OPTICAL FILTER FOR AN OPTICAL SENSOR DEVICE

BACKGROUND

An optical sensor device may be utilized to capture information concerning light. For example, the optical sensor device may capture information relating to a set of wavelengths associated with the light. The optical sensor device may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical sensor device includes an optical sensor comprising a set of sensor elements; an optical filter disposed over the optical sensor, wherein the optical filter includes a plurality of regions, and a region, of the plurality of regions, includes: a first set of optical channels comprising optical channels that are configured to pass light associated with respective subranges of a first wavelength range to respective first subsets of sensor elements, of the set of sensor elements, of the optical sensor, a second set of optical channels comprising optical channels that are configured to pass light associated with respective subranges of a second wavelength range to respective second subsets of sensor elements, of the set of sensor elements, of the optical sensor, and a third set of optical channels comprising optical channels that are configured to pass light associated with respective subranges of a third wavelength range to respective third subsets of sensor elements, of the set of sensor elements, of the optical sensor; and one or more processors configured to: obtain, from the optical sensor, sensor data associated with a scene; determine, based on the sensor data, spectral information associated with the scene; determine, based on the spectral information, image information associated with the scene; and provide the image information.

In some implementations, an optical sensor device includes an optical sensor comprising a set of sensor elements; and an optical filter disposed over the optical sensor, wherein the optical filter includes a plurality of regions, and a region, of the plurality of regions, includes: a first set of optical channels comprising optical channels that are configured to pass light associated with respective subranges of a first wavelength range to respective first subsets of sensor elements, of the set of sensor elements, of the optical sensor, a second set of optical channels comprising optical channels that are configured to pass light associated with respective subranges of a second wavelength range to respective second subsets of sensor elements, of the set of sensor elements, of the optical sensor, and a third set of optical channels comprising optical channels that are configured to pass light associated with respective subranges of a third wavelength range to respective third subsets of sensor elements, of the set of sensor elements, of the optical sensor.

In some implementations, an optical filter includes a plurality of regions, wherein: a region, of the plurality of regions, of the optical filter includes: a first set of optical channels that are associated with passing light associated with a first wavelength range: wherein each optical channel of the first set of optical channels is configured to pass light associated with a particular subrange of the first wavelength range; a second set of optical channels that are associated with passing light associated with a second wavelength range, wherein each optical channel of the second set of optical channels is configured to pass light associated with a particular subrange of the second wavelength range; and a third set of optical channels that are associated with passing light associated with a third wavelength range, wherein each optical channel of the third set of optical channels is configured to pass light associated with a particular subrange of the third wavelength range.

DETAILED DESCRIPTION

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A conventional optical sensor device, such as an imaging device, may be configured to determine color information associated with light (e.g., ambient light) of a scene captured by the optical sensor device. The light may enter the optical sensor device and may be received by a red-green-blue (RGB) optical filter, such as a Bayer filter, and an optical sensor of the optical sensor device (e.g., wherein the RGB optical filter is disposed on the optical sensor). The RGB optical filter may include a two-dimensional array of optical channels, where any 2×2 portion of the array includes a single optical channel configured to pass red light, a single optical channel configured to pass blue light, and two optical channels configured to pass green light (e.g., to mimic color perception of the human eye). Light passed by the RGB optical filter is transmitted to the optical sensor, which generates sensor data.

A processor can process the sensor data using a demosaicing computation technique to determine color points (e.g., in a color space, such as the International Commission on Illumination (CIE) 1931 RGB color space) associated with 2×2 portions of the array of optical channels. These color points can be used to generate an image (e.g., a digital image) of the scene. For example, the processor, when using the demosaicing computation technique, can process a color point associated with a 2×2 portion of the array based on sensor data that is associated with a single optical channel configured to pass red light, a single optical channel configured to pass blue light, and two optical channels configured to pass green light that are part of the 2×2 portion.

However, these optical channels often pass light associated with broad, overlapping wavelength bands (e.g., as further described herein in relation to FIG. 2), which may cause the demosaicing computation technique to produce color points that introduce artifacts (e.g., false color artifacts, zippering artifacts, and/or purple fringing artifacts, among other examples) in an image generated from the color points. This degrades a color accuracy of the image and therefore distorts a representation of the scene in the image.

Some implementations described herein provide an optical sensor device that includes an optical filter, an optical sensor, and one or more processors. The optical filter may include a plurality of optical channels within a plurality of regions of the optical filter. A region, of the plurality of regions, may include a first set of optical channels comprising optical channels that are configured to pass light associated with respective subranges of a first wavelength range (e.g., that is associated with red light), a second set of optical channels comprising optical channels that are configured to pass light associated with respective subranges of a second wavelength range (e.g., that is associated with blue light), and a third set of optical channels comprising optical channels that are configured to pass light associated with respective subranges of a third wavelength range (e.g., that is associated with green light). A first number of optical channels may be included in the first set of optical channels, a first number of optical channels may be included in the second set of optical channels, and a second number of optical channels may be included in the third set of optical channels, where the second number is twice the first number.

In this way, a region of the optical filter may include a ratio of optical channels associated with the first wavelength range (e.g., that is associated with red light), optical channels associated with a second wavelength range (e.g., that is associated with blue light), and optical channels associated with the third wavelength range (e.g., that is associated with green light) that is the same as (e.g., equal to) that of a 2×2 portion of array of optical channels of a conventional RGB optical filter. Accordingly, sensor data associated with the region of the optical filter (e.g., that is generated by the optical sensor based on light associated with a scene that is passed by the optical channels within the region) may be processed by the one or more processors using a demosaicing computation technique to determine a color point associated with the region.

Moreover, the optical filter may pass light associated with narrow, nonoverlapping wavelength bands that are respectively associated with one of red light, blue light, and green light. In this way, the optical filter provides increased spectral fidelity associated with a scene to be imaged, as compared to that of the conventional RGB optical filter. This allows the one or more processors to determine more accurate color points, which decreases a likelihood of artifacts being introduced in an image generated from the color points. This increases a color accuracy of the image and therefore improves an accuracy of a representation of the scene in the image.

Figure 1A:
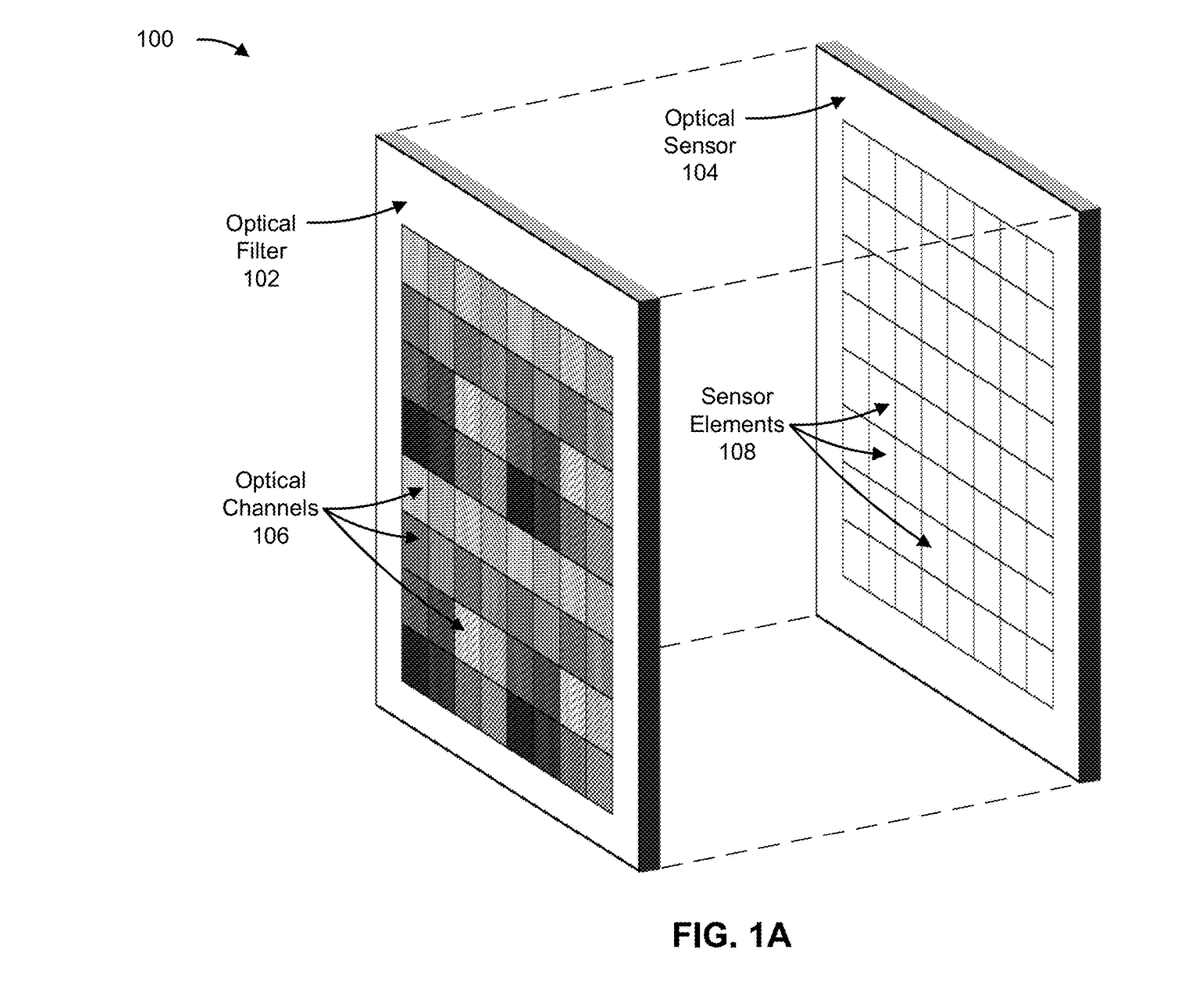
FIGS. 1A-1D are diagrams of an example implementation described herein.

FIGS. 1A-1D are diagrams of an overview of an example implementation 100 described herein. As shown in FIG. 1A, example implementation 100 includes an optical filter 102 (e.g., a thin film optical interference filter) and an optical sensor 104. The optical filter 102 and the optical sensor 104 may be associated with an optical sensor device, which is described in more detail elsewhere herein.

As further shown in FIG. 1A, the optical filter 102 may include a plurality of optical channels 106. The plurality of optical channels 106 may be arranged in a one-dimensional or a two-dimensional array on a surface of the optical filter 102. For example, as shown in FIG. 1A, the plurality of optical channels 106 may be arranged in a two-dimensional array (e.g., where each row of the array includes 8 optical channels 106 and each column includes 8 optical channels 106). The plurality of optical channels 106 may respectively pass light associated with different wavelength ranges, as further described herein.

As further shown in FIG. 1A, the optical sensor 104 may include a plurality of sensor elements 108. The plurality of sensor elements 108 may be arranged in a one-dimensional or a two-dimensional array on a surface of the optical sensor 104. In some implementations, an arrangement of the plurality of sensor elements 108 on the surface of the optical sensor 104 may correspond to an arrangement of the plurality of optical channels 106 on the surface of the optical filter 102, such that an optical channel 106 may be configured to pass light associated with a particular wavelength range to one or more sensor elements 108. For example, as shown in FIG. 1A, the plurality of optical channels 106 and the plurality of sensor elements 108 may each be arranged in a corresponding two-dimensional array (e.g., an 8×8 array).

A sensor element 108 may be configured to obtain information regarding light that falls incident on the sensor element 108 (e.g., after passing through an optical channel 106). For example, a sensor element 108 may provide an indication of intensity of light that falls incident on the sensor element 108 (e.g., active/inactive, or a more granular indication of intensity). The optical sensor 104 may be configured to collect the information obtained by the one or more sensor elements 108 to generate sensor data.

As further shown in FIG. 1A, the optical filter 102 may be disposed over the optical sensor 104 (e.g., such that an arrangement of the optical channels 106 is aligned with an arrangement of the sensor elements 108). The optical filter 102 may be directly disposed on the optical sensor 104 or may be separated from the optical sensor 104 by a free space gap.

Figure 1B:
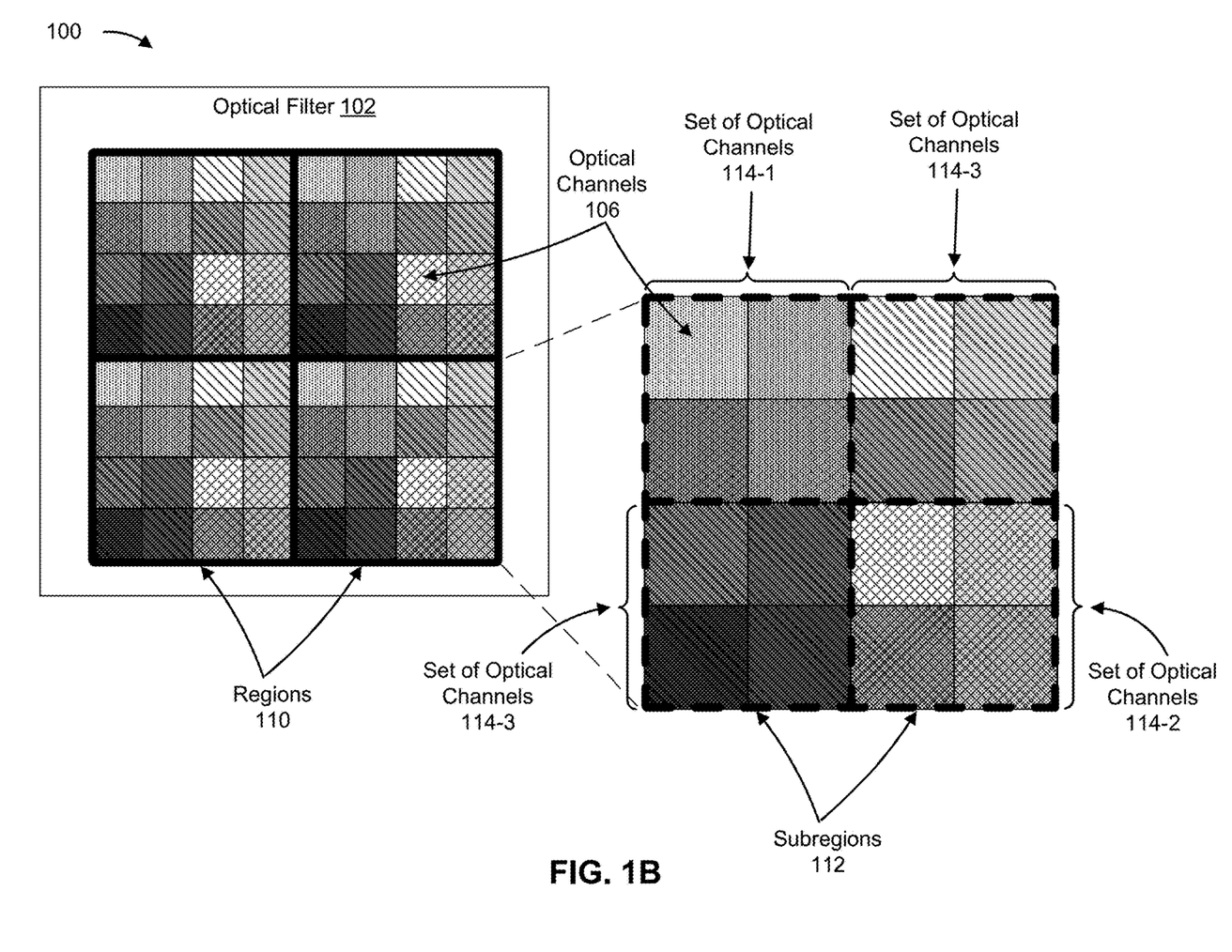
Figure 1C:
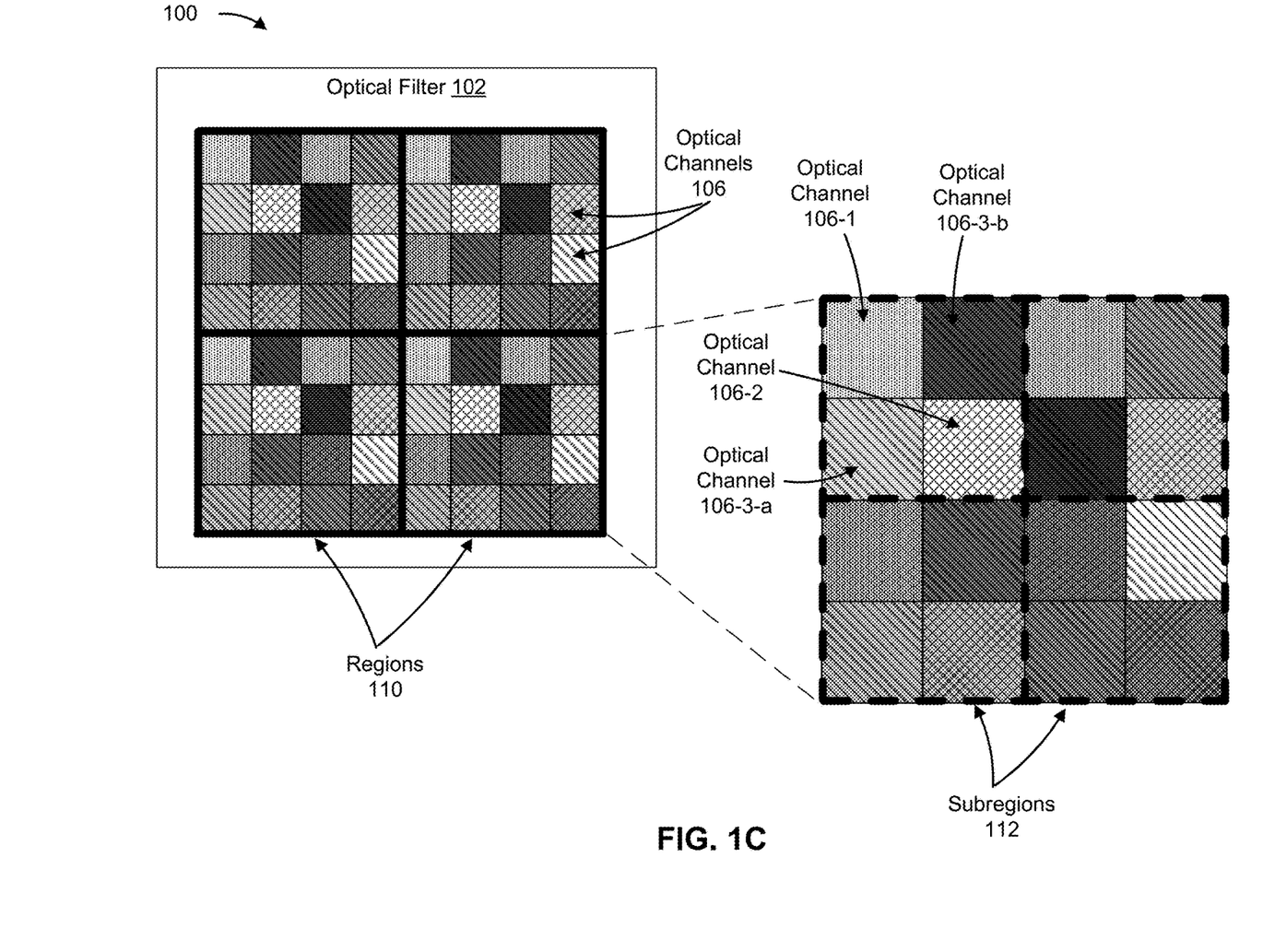

As shown in FIGS. 1B-1C, the plurality of optical channels 106 may be included in a plurality of regions 110 of the optical filter 102 (shown as black square outlines in FIGS. 1B-1C). For example, the optical filter 102 may be divided into a plurality of regions 110, where each region 110 includes a same number of optical channels 106 (e.g., 16 optical channels 106, as shown in FIGS. 1B-1C).

A region 110, of the plurality of regions 110, may include multiple sets of optical channels 114 that are associated with passing light associated with respective wavelength ranges. For example, a region 110 may include a first set of optical channels 114-1 (e.g., that includes optical channels 106 with dotted patterning, as shown in FIGS. 1B-1C) that is associated with passing light associated with a first wavelength range, a second set of optical channels 114-2 (e.g., that includes optical channels 106 with diamond patterning, as shown in FIGS. 1B-1C) that is associated with passing light associated with a second wavelength range, and/or a third set of optical channels 114-3 (e.g., that includes optical channels 106 with diagonal patterning, as shown in FIGS. 1B-1C) that is associated with passing light associated with a third wavelength range.

In some implementations, the first wavelength range may be associated with red light, the second wavelength range may be associated with blue light, and the third wavelength range may be associated with green light. That is, the first wavelength range, the second wavelength range, and the third wavelength range may be associated with wavelength ranges associated with a conventional red-green-blue (RGB) optical filter. For example, the first wavelength range may be approximately 600 to 700 nanometers (e.g., greater than or equal to 600 nanometers and less than 700 nanometers), the second wavelength range may be approximately 400 to 500 nanometers (e.g., greater than or equal to 400 nanometers and less than 500 nanometers), and the third wavelength range may be approximately 500 nanometers to 600 nanometers (e.g., greater than or equal to 500 nanometers and less than 600 nanometers). Other implementations are contemplated. For example, a wavelength range of the first wavelength, the second wavelength range, and/or the third wavelength range, may be associated with ultraviolet light (e.g., approximately 100 to 400 nanometers) and/or near infrared light (e.g., approximately 700 to 1000 nanometers), among other examples.

In some implementations, each optical channel 106 of the first set of optical channels 114-1 may be configured to pass light associated with a particular subrange of the first wavelength range (e.g., to a set of sensor elements 108 associated with the optical channel 106). For example, as shown in FIGS. 1B-1C, each optical channel 106 (e.g., that has dotted patterning) of the first set of optical channels 114-1 are depicted as having a different amount of shading to indicate that each optical channel 106 is configured to pass light associated with a different subrange of the first wavelength range (e.g., a different subrange of red light). Accordingly, a composition of an optical channel 106 of the first set of optical channels 114-1 may be different than a composition of each of the other optical channels 106 of the first set of optical channels 114-1. For example, each optical channel 106 of the first set of optical channels 114-1 may comprise a set of thin film layers that comprise a different number of thin film layers, a different arrangement of the thin film layers, and/or a different thickness of the thin film layers, among other examples.

In some implementations, each optical channel 106 of the second set of optical channels 114-2 may be configured to pass light associated with a particular subrange of the second wavelength range (e.g., to a set of sensor elements 108 associated with the optical channel 106). For example, as shown in FIGS. 1B-1C, each optical channel 106 (e.g., that has diamond patterning) of the second set of optical channels 114-2 are depicted as having a different amount of shading to indicate that each optical channel 106 is configured to pass light associated with a different subrange of the second wavelength range (e.g., a different subrange of blue light). Accordingly, a composition of an optical channel 106 of the second set of optical channels 114-2 may be different than a composition of each of the other optical channels 106 of the second set of optical channels 114-2. For example, each optical channel 106 of the second set of optical channels 114-2 may comprise a set of thin film layers that comprise a different number of thin film layers, a different arrangement of the thin film layers, and/or a different thickness of the thin film layers, among other examples.

In some implementations, each optical channel 106 of the third set of optical channels 114-3 may be configured to pass light associated with a particular subrange of the third wavelength range (e.g., to a set of sensor elements 108 associated with the optical channel 106). For example, as shown in FIGS. 1B-1C, each optical channel 106 (e.g., that has diagonal patterning) of the third set of optical channels 114-3 are depicted as having a different amount of shading to indicate that each optical channel 106 is configured to pass light associated with a different subrange of the third wavelength range (e.g., a different subrange of green light).

Accordingly, a composition of an optical channel 106 of the third set of optical channels 114-3 may be different than a composition of each of the other optical channels 106 of the third set of optical channels 114-3. For example, each optical channel 106 of the third set of optical channels 114-3 may comprise a set of thin film layers that comprise a different number of thin film layers, a different arrangement of the thin film layers, and/or a different thickness of the thin film layers, among other examples.

In some implementations, a number of optical channels 106 included in the first set of optical channels 114-1 may be the same as (e.g., equal to) a number of optical channels 106 included in the second of optical channels 114-2. Additionally, or alternatively, a number of optical channels 106 included in the third set of optical channels 114-1 may be a sum of the number of optical channels 106 included in the first set of optical channels 114-1 and the number of optical channels 106 included in the second of optical channels 114-2. Stated another way, a first number of optical channels 106 may be included in the first set of optical channels 114-1, a first number of optical channels 106 may be included in the second set of optical channels 114-2, and a second number of optical channels 106 may be included in the third set of optical channels 114-3, where the second number is twice the first number. For example, as shown in FIG. 1B, a first set of optical channels 114-1 may include 4 optical channels 106, a second set of optical channels 114-2 may include 4 optical channels 106, and the third set of optical channels 114-3 may include 8 optical channels 106.

In this way, a region 110 of the optical filter 102 may include a ratio of optical channels 106 associated with the first wavelength range (e.g., that is associated with red light), optical channels 106 associated with a second wavelength range (e.g., that is associated with blue light), and optical channels 106 associated with the third wavelength range (e.g., that is associated with green light) that is the same as (e.g., equal to) that of a conventional RGB optical filter. Accordingly, sensor data (e.g., that is generated by the optical sensor 104) associated with region 110 of the optical filter 102 may be processed using a demosaicing computation technique (e.g., as described herein in relation to FIG. 1D).

As further shown in FIGS. 1B-1C, a region 110, of the plurality of regions 110, may include a plurality of subregions 112 (shown as dashed-line boxes in FIGS. 1B-1C). In some implementations, the first set of optical channels 114-1 may be included within a first subregion 112 of the region 110, the second set of optical channels 114-2 may be included within a second subregion 112 of the region 110, a portion of the third set of optical channels 114-3 may be included within a third subregion 112 of the region 110, and another portion of the third set of optical channels 114-3 may be included within a fourth subregion 112 of the region 110. For example, as shown in FIG. 1B, the first set of optical channels 114-1 may be included within an upper left subregion 112 of the region 110, the second set of optical channels 114-2 may be included within a lower right subregion 112 of the region 110, the portion of the third set of optical channels 114-3 may be included within an upper right subregion 112 of the region 110, and the other portion of the third set of optical channels 114-3 may be included within a lower left subregion 112 of the region 110.

In some implementations, a first number of optical channels 106 (e.g., at least one optical channel 106) of the first set of optical channels 114-1 may be within a subregion 112, a first number of optical channels 106 (e.g., at least one optical channel 106) of the second set of optical channels 114-2 may be within the subregion 112, and a second number of optical channels 106 (e.g., at least two optical channels 106) of the third set of optical channels 114-2 may be within the subregion 112, where the second number may be twice the first number. For example, as shown in FIG. 1C, an upper left subregion 112 of the region 110 may include one optical channel 106-1 of the first set of optical channels 114-1, one optical channel 106-2 of the second set of optical channels 114-2, and two optical channels 106-3-a and 106-3-b of the third set of optical channels 114-3. In this way, a subregion 112 of the optical filter 102 may include a ratio of optical channels 106 associated with the first wavelength range (e.g., that is associated with red light), optical channels 106 associated with a second wavelength range (e.g., that is associated with blue light), and optical channels 106 associated with the third wavelength range (e.g., that is associated with green light) that is the same as (e.g., equal to) that of the region 110 of which the subregion 112 is included.

Figure 1D:
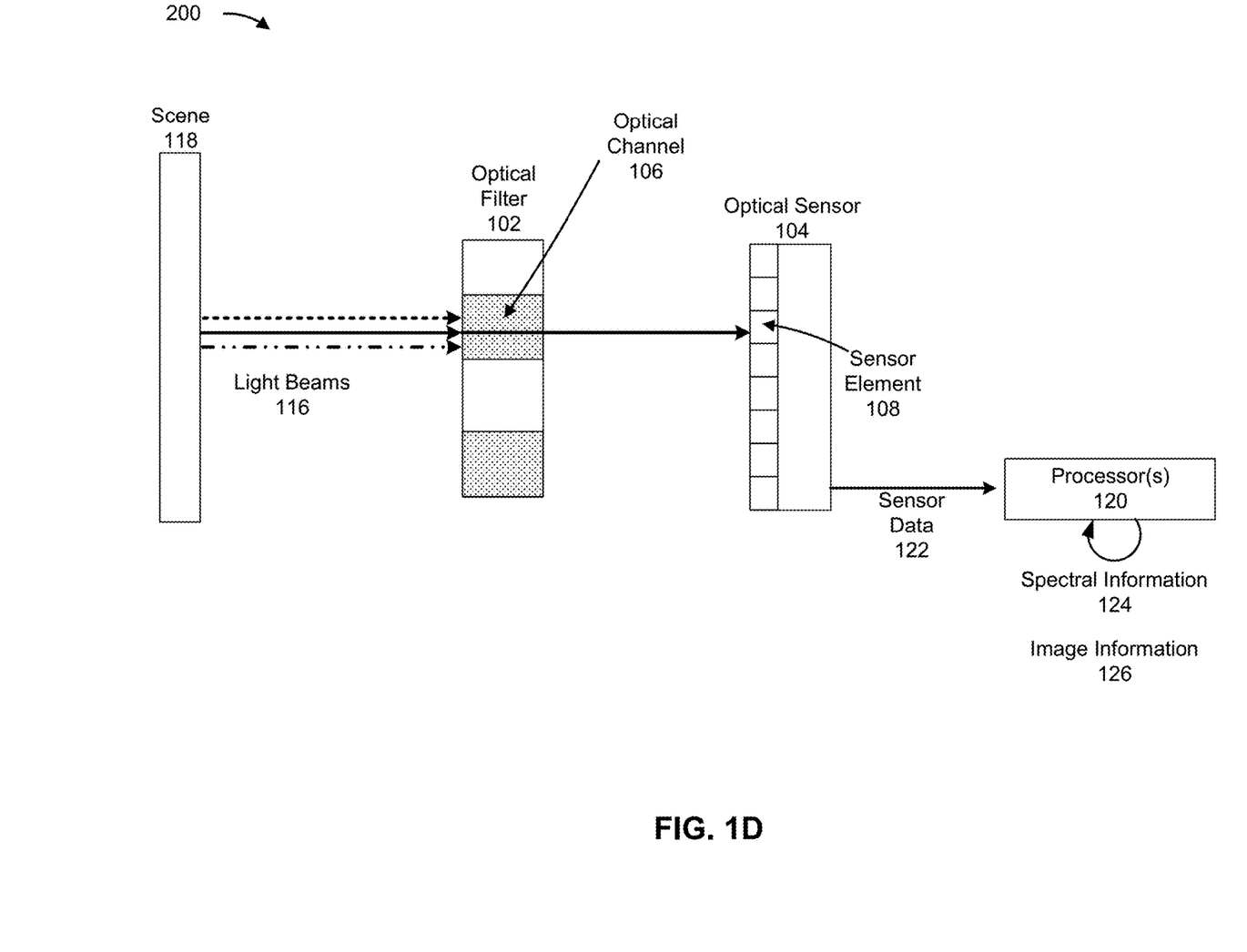

As shown in FIG. 1D, light beams 116 associated with a scene 118 (e.g., a scene that is to be imaged) may originate from the scene 118. The light beams 116 may transmit to the optical filter 102 and may fall incident on a particular optical channel 106. The particular optical channel 106 may be included in particular set of optical channels 114 that is associated with passing light associated with a particular wavelength range. Accordingly, the particular optical channel 106 may pass a particular light beam 116, of the light beams 116, that is associated with a particular subrange of the particular wavelength range (e.g., that the particular optical channel 106 is configured to pass) to a particular sensor element 108 of the optical sensor 104 (e.g., a sensor element 108 that is configured to receive light from the particular optical channel 106). In this way, the plurality of sensor elements 108 may capture data related to light associated with subranges of the first wavelength range, the second wavelength range, and/or the third wavelength range.

As further shown in FIG. 1D, the optical sensor 104 may be associated with one or more processors 120 and may provide, as shown by reference number 122, sensor data to the one or more processors 120. The sensor data may indicate information relating to light that originated from the scene 118 and passed through the optical channels 106 of the optical filter 102 to the plurality of sensor elements 108, such as an indication of intensity of the light that was received by the plurality of sensor elements 108.

As further shown in FIG. 1D, and by reference number 124, the one or more processors 120 may process the sensor data to determine spectral information associated with the scene 118. For example, the one or more processors 120 may identify, based on the sensor data, a particular sensor element 108 of the optical sensor 104 that received a light beam 116. The one or more processors 120 may determine, based on configuration information associated with the optical filter 102 (e.g., that is stored in a data structure that is accessible by the one or more processors 120), that the particular sensor element 108 is associated with a particular optical channel 106 of the optical filter 102 (e.g., the particular sensor element 108 is configured to receive light beams passed by the particular optical channel 106) and may identify the particular optical channel 106 as having received and passed the light beam 116 to the particular sensor element 108. Further, the one or more processors 120 may determine, based on the configuration information, that the particular optical channel 106 is configured to pass light beams associated with a particular subrange of a particular wavelength range and therefore may determine that the light beam 116 is associated with the particular subrange of the particular wavelength range. In this way, the one or more processors may determine spectral values that indicate amounts of light associated with different subranges of different wavelength ranges that was received by the plurality of optical channels 106 and passed to the plurality of sensor elements 108.

As further shown in FIG. 1D, and by reference number 126, the one or more processors 120 may process the spectral information to determine image information associated with the scene 118. In some implementations, the one or more processors 120 may process the spectral information using a digital imaging processing technique, such as a demosaicing computation technique, to determine the image information. The image information may indicate at least one color point (e.g., in a color space, such as the International Commission on Illumination (CIE) 1931 RGB color space) that is associated with a region 110 of the optical filter 102 (e.g., that is associated with light that originated from the scene 118 and that was passed by optical channels 106 within the region 110). Additionally, or alternatively, the image information may indicate at least one color point that is associated with a subregion 112 of the region 110 of the optical filter 102 (e.g., that is associated with light that originated from the scene 118 and that was passed by optical channels 106 within the subregion 112 of the region 110).

In an example, the one or more processors 120 may identify a first portion of the spectral information that is associated with a first set of optical channels 114-1 within a region 110 of the optical filter 102 (e.g., spectral information that is based on sensor data generated by a first set of sensor elements 108 associated with the first set of optical channels 114-1), a second portion of the spectral information that is associated with a second set of optical channels 114-2 within the region 110 of the optical filter 102 (e.g., spectral information that is based on sensor data generated by a second set of sensor elements 108 associated with the second set of optical channels 114-2), a third portion of the spectral information that is associated with a portion of a third set of optical channels 114-3 within the region 110 of the optical filter 102 (e.g., spectral information that is based on sensor data generated by a third set of sensor elements 108 associated with the portion of the third set of optical channels 114-3), and/or a fourth portion of the spectral information that is associated with another portion of the third set of optical channels 114-3 within the region 110 of the optical filter 102 (e.g., spectral information that is based on sensor data generated by a fourth set of sensor elements 108 associated with the other portion of the third set of optical channels 114-3). The one or more processors 120 may process the first portion of the spectral information to determine a first spectral value (e.g., that is an average of respective spectral values of the first set of optical channels 114-1), may process the second portion of the spectral information to determine a second spectral value (e.g., that is an average of respective spectral values of the second set of optical channels 114-2), may process the third portion of the spectral information to determine a third spectral value (e.g., that is an average of respective spectral values of the portion of the third set of optical channels 114-3), and may process the fourth portion of the spectral information to determine a fourth spectral value (e.g., that is an average of respective spectral values of the other portion of the third set of optical channels 114-3).

In this way, the one or more processors may determine a spectral value (e.g., the first spectral value) associated with the first wavelength range (e.g., that is associated with red light), may determine a spectral value (e.g., the second spectral value) associated with the second wavelength range (e.g., that is associated with blue light), and may determine two spectral values (e.g., the third spectral value and the fourth spectral value) associated with the third wavelength range (e.g., that is associated with green light). Accordingly, the one or more processors 120 may process, using a demosaicing computation technique, the first spectral value, the second spectral value, the third spectral value, and the fourth spectral value, a color point that is associated with the region 110 of the optical filter 102.

In an additional example, the one or more processors 120 may identify a first portion of the spectral information that is associated with a subset of the first set of optical channels 114-1 within a subregion 112 of the region 110 of the optical filter 102 (e.g., spectral information that is based on sensor data generated by a first set of sensor elements 108 associated with the subset of the first set of optical channels 114-1), a second portion of the spectral information that is associated with a subset of the second set of optical channels 114-2 within the subregion 112 of the region 110 of the optical filter 102 (e.g., spectral information that is based on sensor data generated by a second set of sensor elements 108 associated with the subset of the second set of optical channels 114-2), a third portion of the spectral information that is associated with a first subset of the third set of optical channels 114-3 of the subregion 112 of the region 110 of the optical filter 102 (e.g., spectral information that is based on sensor data generated by a third set of sensor elements 108 associated with the first subset of the third set of optical channels 114-3), and/or a fourth portion of the spectral information that is associated with a second subset of the third set of optical channels 114-3 of the subregion 112 of the region 110 of the optical filter 102 (e.g., spectral information that is based on sensor data generated by a fourth set of sensor elements 108 associated with the second subset of the third set of optical channels 114-3). The one or more processors 120 may process the first portion of the spectral information to determine a first spectral value (e.g., that is an average of respective spectral values of the subset of the first set of optical channels 114-1), may process the second portion of the spectral information to determine a second spectral value (e.g., that is an average of respective spectral values of the subset of the second set of optical channels 114-2), may process the third portion of the spectral information to determine a third spectral value (e.g., that is an average of respective spectral values of the first subset of the third set of optical channels 114-3), and may process the fourth portion of the spectral information to determine a fourth spectral value (e.g., that is an average of respective spectral values of the second subset of the third set of optical channels 114-3).

In this way, the one or more processors 120 may determine a spectral value (e.g., the first spectral value) associated with the first wavelength range (e.g., that is associated with red light), may determine a spectral value (e.g., the second spectral value) associated with the second wavelength range (e.g., that is associated with blue light), and may determine two spectral values (e.g., the third spectral value and the fourth spectral value) associated with the third wavelength range (e.g., that is associated with green light). Accordingly, the one or more processors 120 may process, using a demosaicing computation technique, the first spectral value, the second spectral value, the third spectral value, and the fourth spectral value, a color point that is associated with the subregion 112 of the region 110 of the optical filter 102.

In some implementations, the one or more processors 120 may provide the image information. For example, the one or more processors 120 may generate, based on the image information, an image and may cause display of the image information on a display (e.g., that is associated with the optical sensor device). As another example, the one or more processors may send the image information to another device, such as a user device, to cause the other device to generate the image and to display the image on a display of the other device.

As indicated above, FIGS. 1A-1D are provided as examples. Other examples may differ from what is described with regard to FIGS. 1A-1D.

Figure 2:
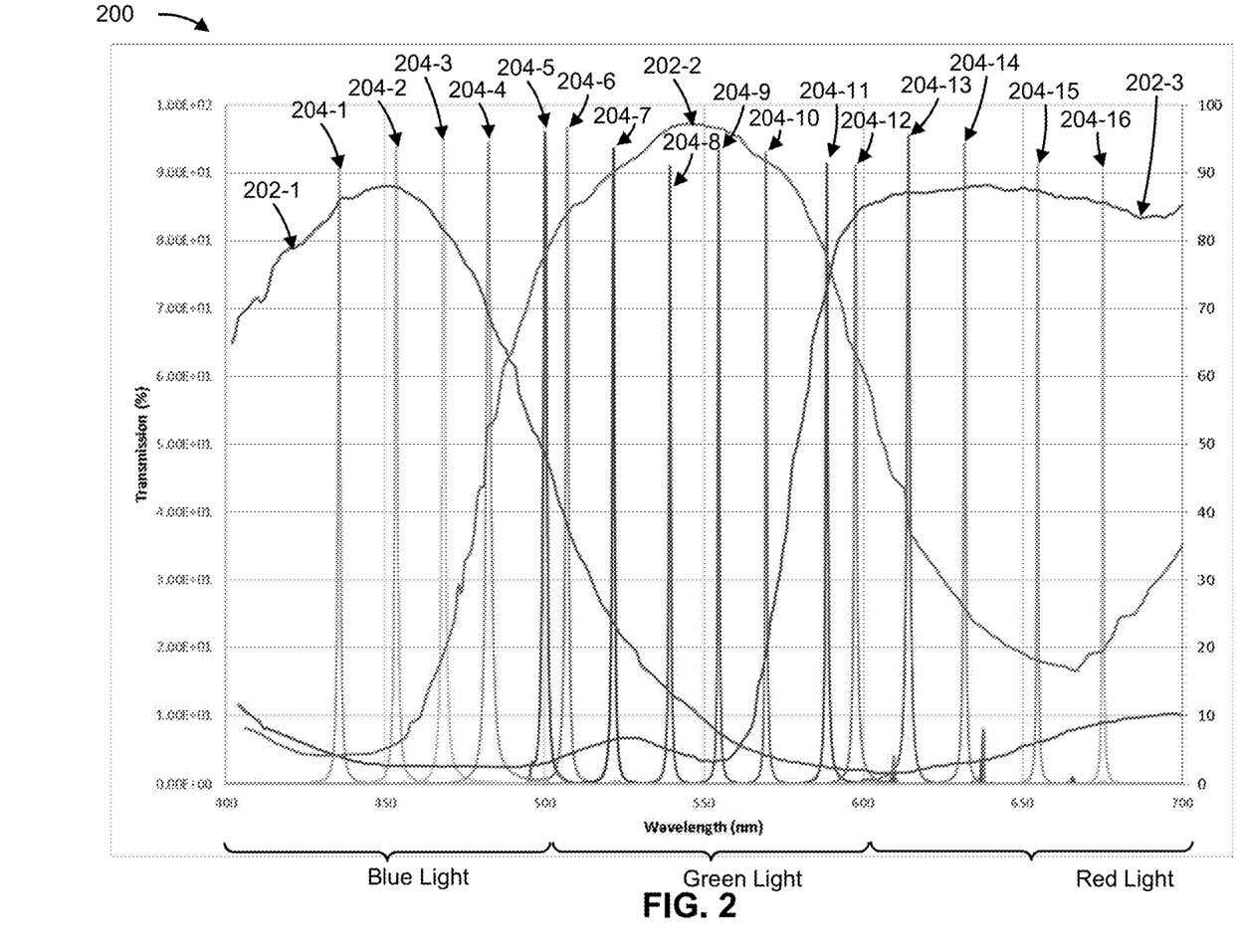
FIG. 2 is a diagram of transmission characteristics of a conventional red-green-blue (RGB) optical filter and of an optical filter described herein

FIG. 2 is a diagram 200 of transmission characteristics of a conventional RGB optical filter and of an optical filter described herein (e.g., optical filter 102). As described above, a conventional RGB optical filter comprises a regular pattern of three types of optical channels: a first optical channel configured to pass light associated with red light, a second optical channel configured to pass light associated with blue light, and a third optical channel configured to pass light associated with green light. Accordingly, as shown in FIG. 2 and by reference numbers 202-1 through 202-3, the conventional RGB optical filter may pass light associated with broad, overlapping wavelength bands that are associated with red light, blue light, and/or green light.

In contrast, the optical filter 102 may comprise a plurality of optical channels 106 that are each configured to pass light associated with a subrange of a wavelength range. For example, a region 110 of the optical filter 102 may include a first set of optical channels 114-1 that are configured to pass red light, a second set of optical channels 114-2 that are configured to pass blue light, and a third set of optical channels 114-3 that are configured to pass green light. Accordingly, as further shown in FIG. 2 and by reference numbers 204-1 through 204-16, the optical filter 102 may pass light associated with narrow, nonoverlapping wavelength bands that are respectively associated with one of red light, blue light, and green light. In this way, the optical filter 102 may provide increased spectral fidelity associated with a scene to be imaged, as compared to the conventional RGB optical filter, which may allow more accurate color points to be determined and thereby enable a more color accurate image of the scene to be generated.

As indicated above, FIG. 2 is provided as an example. Other examples may differ from what is described with regard to FIG. 2.

Figure 3:
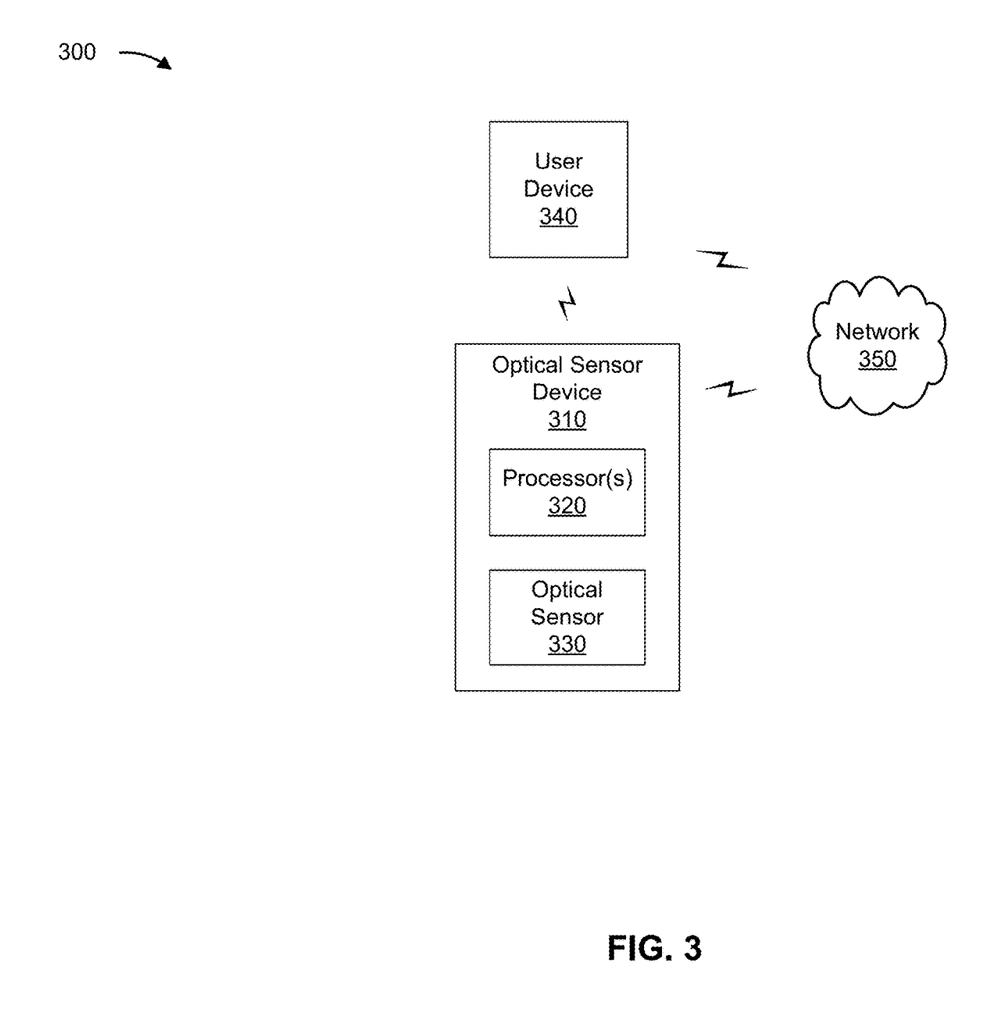
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an optical sensor device 310 that may include one or more processors 320 (e.g., that correspond to the one or more processors 120 described herein in relation to FIG. 1D) and an optical sensor 330 (e.g., that corresponds to the optical sensor 104 described herein in relation to FIGS. 1A-1D). The environment 300 may also include a user device 340 and a network 350. Devices of environment 300 may interconnect via wired connections, wireless connections, or a combination of wired and wireless connections.

Optical sensor device 310 may include an optical device capable of storing, processing, and/or routing spectral information and/or image information associated with a scene. For example, optical sensor device 310 may include a spectrometer device that performs spectroscopy, such as a spectral optical sensor device (e.g., a binary multispectral optical sensor device that performs vibrational spectroscopy, such as a near infrared (NIR) spectrometer, a mid-infrared spectroscopy (mid-IR), Raman spectroscopy, and/or the like). In some implementations, optical sensor device 310 may be incorporated into user device 340, such as a wearable spectrometer and/or the like. In some implementations, optical sensor device 310 may receive information from and/or transmit information to another device in environment 300, such as user device 340.

In some implementations, optical sensor device 310 may comprise a spectral imaging camera. A spectral imaging camera is a device that can capture an image of a scene. A spectral imaging camera (or a processor 320 associated with the spectral imaging camera) may be capable of determining spectral content or changes in spectral content at different points in an image of a scene, such as any point in an image of a scene.

In some implementations, optical sensor device 310 may comprise a spectral imaging camera capable of performing hyperspectral imaging. For example, optical sensor device 310 may include an optical filter (e.g., optical filter 102, described herein in relation to FIGS. 1A-1D). In some implementations, the optical filter may be disposed over optical sensor 330.

Optical sensor device 310 may include one or more processors 320, described in more detail in connection with FIG. 4.

Optical sensor device 310 may include an optical sensor 330. Optical sensor 330 includes a device capable of sensing light. For example, optical sensor 330 may include an image sensor, a multispectral sensor, a spectral sensor, and/or the like. In some implementations, optical sensor 330 may include a silicon (Si) based sensor, an indium-gallium-arsenide (InGaAs) based sensor, a lead-sulfide (PbS) based sensor, or a germanium (Ge) based sensor, and may utilize one or more sensor technologies, such as a complementary metal-oxide-semiconductor (CMOS) technology, or a charge-coupled device (CCD) technology, among other examples. In some implementations, optical sensor 330 may include a front-side illumination (FSI) sensor, a back-side illumination (BSI) sensor, and/or the like. In some implementations, optical sensor 330 may be included in a camera of optical sensor device 310 and/or user device 340.

User device 340 includes one or more devices capable of receiving, generating, storing, processing, and/or providing the spectral information and/or the image information associated with the scene. For example, user device 340 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, user device 340 may receive information from and/or transmit information to another device in environment 300, such as optical sensor device 310.

Network 350 includes one or more wired and/or wireless networks. For example, network 350 may include a cellular network (e.g., a long-term evolution (L1E) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. For example, although optical sensor device 310 and user device 340 are described as separate devices, optical sensor device 310 and user device 340 may be implemented as a single device. Additionally, or alternatively, a set of devices (e.g., one or more devices) of environment 300 may perform one or more functions described as being performed by another set of devices of environment 300.

Figure 4:
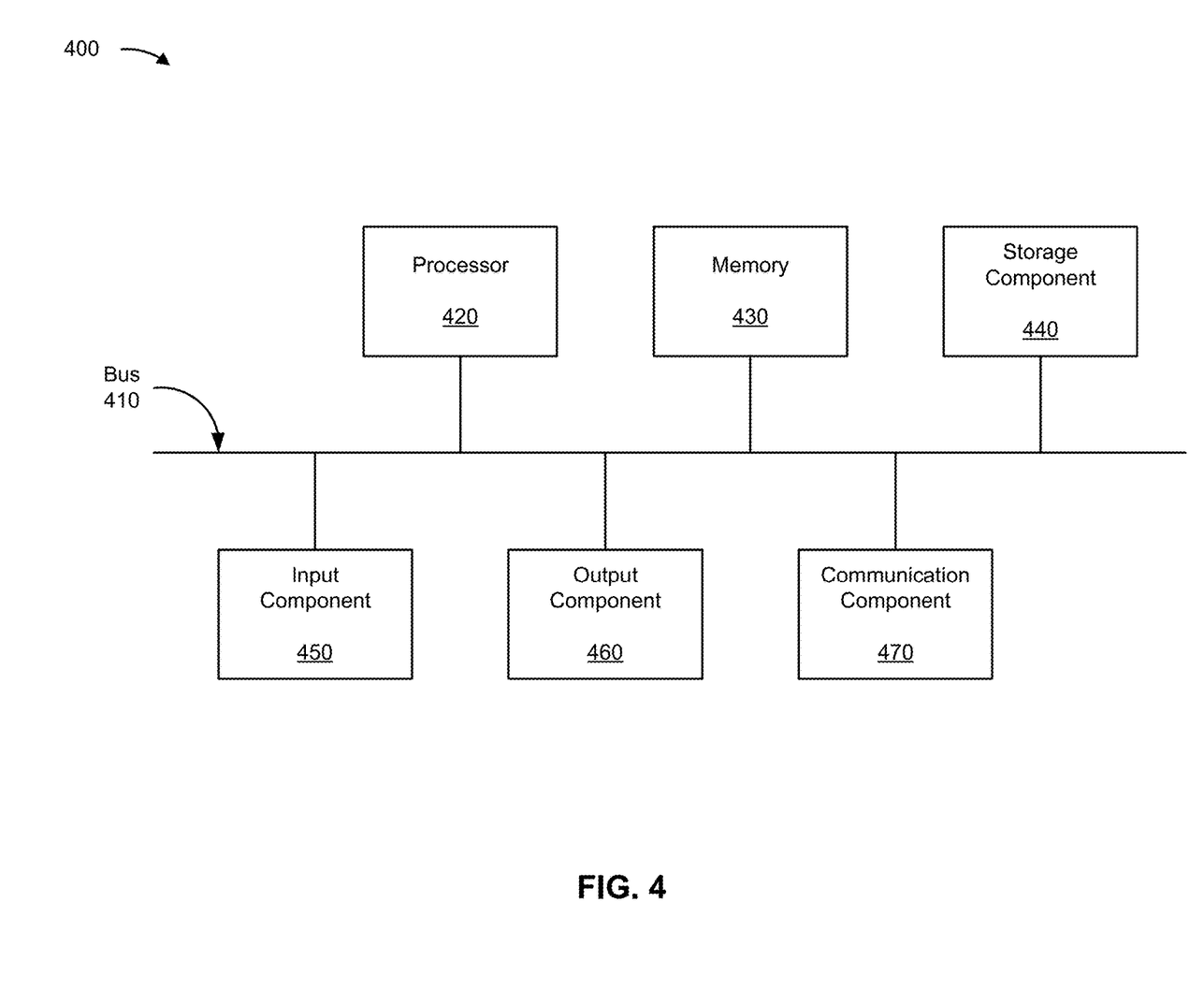
FIG. 4 is a diagram of example components of one or more devices of FIG. 3.

FIG. 4 is a diagram of example components of a device 400. Device 400 may correspond to optical sensor device 310 and/or user device 340. In some implementations, optical sensor device 310 and/or user device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RANI), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication component 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication component 470 may permit device 400 to receive information from another device and/or provide information to another device. For example, communication component 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication component 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
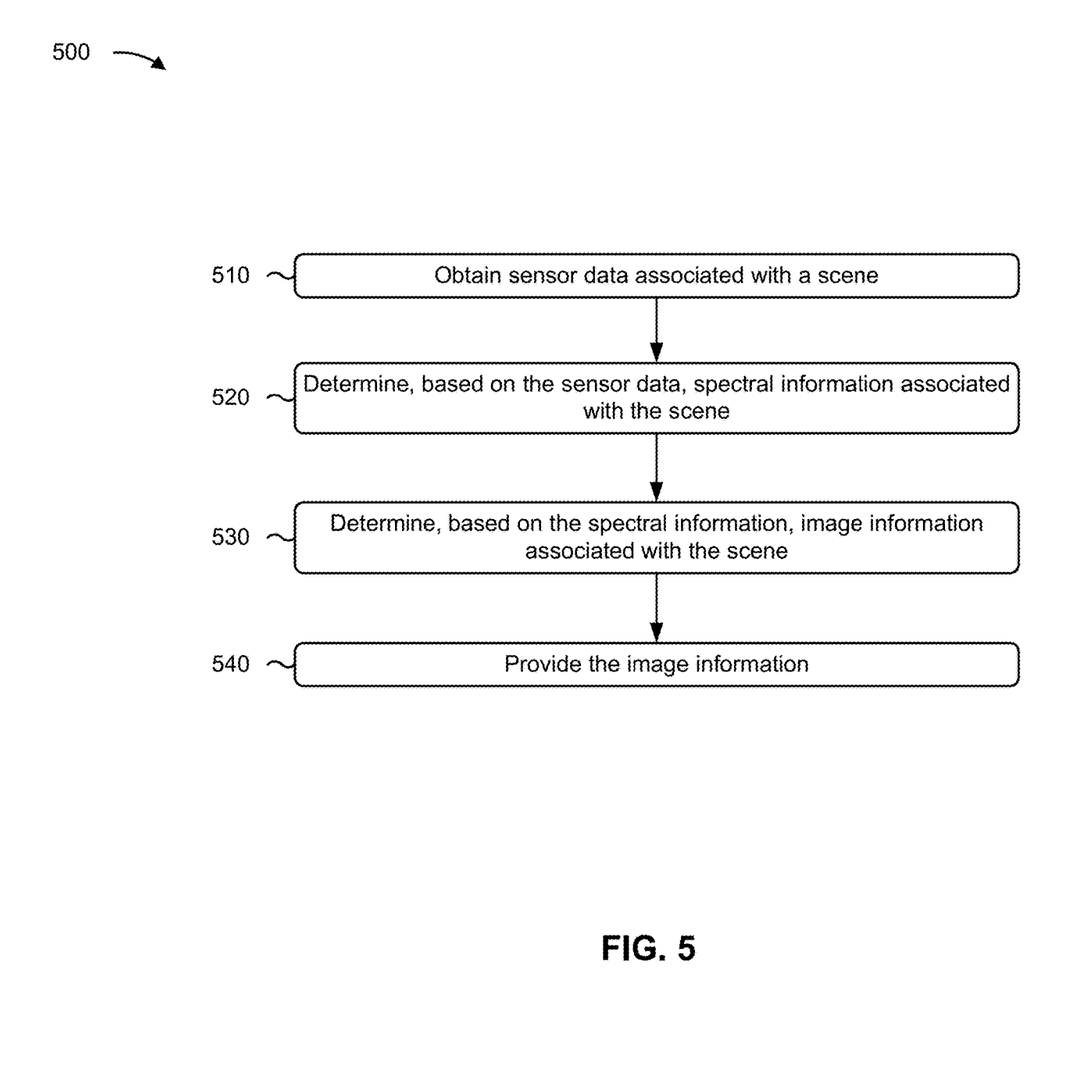
FIG. 5 is a flowchart of an example process associated with an optical sensor device.

FIG. 5 is a flowchart of an example process 500 associated with an optical sensor device (e.g., optical sensor device 310). In some implementations, one or more process blocks of FIG. 5 may be performed by one or more processors (e.g., one or more processors 120 or one or more processors 320) of the optical sensor device. In some implementations, one or more process blocks of FIG. 5 may be performed by another device or a group of devices separate from or including the one or more processors, such as a user device (e.g., user device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include obtaining sensor data associated with a scene (block 510). For example, the one or more processors may obtain sensor data associated with a scene, as described above.

As further shown in FIG. 5, process 500 may include determining, based on the sensor data, spectral information associated with the scene (block 520). For example, the one or more processors may determine, based on the sensor data, spectral information associated with the scene, as described above.

As further shown in FIG. 5, process 500 may include determining, based on the spectral information, image information associated with the scene (block 530). For example, the one or more processors may determine, based on the spectral information, image information associated with the scene, as described above. In some implementations, the image information indicates at least one color point associated with a region of an optical filter of the optical sensor device.

In some implementations, determining the image information includes processing a first portion of the spectral information that is associated with the first set of optical channels to determine a first spectral value associated with the first wavelength range; processing a second portion of the spectral information that is associated with the second set of optical channels to determine a second spectral value associated with the second wavelength range; processing a third portion of the spectral information that is associated with a portion of the third set of optical channels to determine a third spectral value associated with the third wavelength range; processing a fourth portion of the spectral information that is associated with another portion of the third set of optical channels to determine a fourth spectral value associated with the third wavelength range; and determining, using a demosaicing computational technique and based on the first spectral value, the second spectral value, the third spectral value, and the fourth spectral value, a color point associated with the region of the optical filter.

In some implementations, determining the image information includes identifying at least one of the set of first optical channels that is associated with a subregion of the region of the optical filter, at least one of the second set of optical channels associated with the subregion, and at least two of the third set of optical channels associated with the subregion; processing a first portion of the spectral information that is associated with the at least one of the first set of optical channels to determine a first spectral value associated with the first wavelength range; processing a second portion of the spectral information that is associated with the at least one of the second set of optical channels to determine a second spectral value associated with the second wavelength range; processing a third portion of the spectral information that is associated with a portion of the at least two of the third set of optical channels to determine a third spectral value associated with the third wavelength range; processing a fourth portion of the spectral information that is associated with another portion of the at least two of the third set of optical channels to determine a fourth spectral value associated with the third wavelength range; and determining, using a demosaicing computational technique and based on the first spectral value, the second spectral value, the third spectral value, and the fourth spectral value, a color point associated with the subregion of the optical filter.

As further shown in FIG. 5, process 500 may include providing the image information (block 540). For example, the one or more processors may provide the image information, as described above. In some implementations, providing the image information includes generating, based on the image information, an image, and causing display of the image information on a display associated with the optical sensor device.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical sensor device, comprising:
   an optical sensor comprising a set of sensor elements;
   an optical filter disposed over the optical sensor,
   wherein the optical filter includes a plurality of regions,
   wherein a region, of the plurality of regions, includes:
   a first set of optical channels comprising optical channels that are configured to pass light associated with respective subranges of a first wavelength range to respective first subsets of sensor elements, of the set of sensor elements, of the optical sensor,
   a second set of optical channels comprising optical channels that are configured to pass light associated with respective subranges of a second wavelength range to respective second subsets of sensor elements, of the set of sensor elements, of the optical sensor, and
   a third set of optical channels comprising optical channels that are configured to pass light associated with respective subranges of a third wavelength range to respective third subsets of sensor elements, of the set of sensor elements, of the optical sensor,
   wherein the first set of optical channels includes a first optical channel, a second optical channel, and a third optical channel, and
   wherein the first optical channel is adjacent to the second optical channel and the third optical channel; and
   one or more processors configured to:
   obtain, from the optical sensor, sensor data associated with a scene;
   determine, based on the sensor data, spectral information associated with the scene;
   determine, based on the spectral information, image information associated with the scene; and
   provide the image information.

2. The optical sensor device of claim 1, wherein:
   the first wavelength range is associated with red light;
   the second wavelength range is associated with blue light; and
   the third wavelength range is associated with green light.

3. The optical sensor device of claim 1, wherein:
   a number of optical channels included in the first set of optical channels is equal to a number of optical channels included in the second set of optical channels; and
   a number of optical channels included in the third set of optical channels is equal to a sum of the number of the optical channels included in first set of optical channels and the number of optical channels included in the second set of optical channels.

4. The optical sensor device of claim 1, wherein:
   the first set of optical channels is within a first subregion of the region;
   the second set of optical channels is within a second subregion of the region;
   a portion of the third set of optical channels is within a third subregion of the region; and
   another portion of the third set of optical channels is within a fourth subregion of the region.

5. The optical sensor device of claim 1,
   wherein the region comprises a plurality of subregions, and
   wherein:
   at least one optical channel of the first set of optical channels is within each of the plurality of subregions;
   at least one optical channel of the second set of optical channels is within each of the plurality of subregions; and
   at least two optical channels of the third set of optical channels are within each of the plurality of subregions.

6. The optical sensor device of claim 1, wherein the region comprises a subregion that includes:
   one optical channel of the first set of optical channels;
   one optical channel of the second set of optical channels; and
   two optical channels of the third set of optical channels.

7. The optical sensor device of claim 1, wherein the image information indicates at least one color point associated with the region of the optical filter.

8. The optical sensor device of claim 1, wherein the one or more processors are configured to, when determining the image information:
   process a first portion of the spectral information that is associated with the first set of optical channels to determine a first spectral value associated with the first wavelength range;
   process a second portion of the spectral information that is associated with the second set of optical channels to determine a second spectral value associated with the second wavelength range;
   process a third portion of the spectral information that is associated with a portion of the third set of optical channels to determine a third spectral value associated with the third wavelength range;
   process a fourth portion of the spectral information that is associated with another portion of the third set of optical channels to determine a fourth spectral value associated with the third wavelength range; and
   determine, using a demosaicing computational technique and based on the first spectral value, the second spectral value, the third spectral value, and the fourth spectral value, a color point associated with the region of the optical filter.

9. The optical sensor device of claim 1, wherein the one or more processors are configured to, when determining the image information:
   identify at least one of the set of first optical channels that is associated with a subregion of the region of the optical filter, at least one of the second set of optical channels associated with the subregion, and at least two of the third set of optical channels associated with the subregion;
   process a first portion of the spectral information that is associated with the at least one of the first set of optical channels to determine a first spectral value associated with the first wavelength range;
   process a second portion of the spectral information that is associated with the at least one of the second set of optical channels to determine a second spectral value associated with the second wavelength range;
   process a third portion of the spectral information that is associated with a portion of the at least two of the third set of optical channels to determine a third spectral value associated with the third wavelength range;
   process a fourth portion of the spectral information that is associated with another portion of the at least two of the third set of optical channels to determine a fourth spectral value associated with the third wavelength range; and
   determine, using a demosaicing computational technique and based on the first spectral value, the second spectral value, the third spectral value, and the fourth spectral value, a color point associated with the subregion of the optical filter.

10. The optical sensor device of claim 1, wherein the one or more processors are configured to, when providing the image information:
   generate, based on the image information, an image; and
   cause display of the image information on a display associated with the optical sensor device.

11. An optical sensor device, comprising:
   an optical sensor comprising a set of sensor elements; and
   an optical filter disposed over the optical sensor,
      wherein the optical filter includes a plurality of regions,
      wherein a region, of the plurality of regions, includes:
         a first set of optical channels comprising optical channels that are configured to pass light associated with respective subranges of a first wavelength range to respective first subsets of sensor elements, of the set of sensor elements, of the optical sensor,
         a second set of optical channels comprising optical channels that are configured to pass light associated with respective subranges of a second wavelength range to respective second subsets of sensor elements, of the set of sensor elements, of the optical sensor, and
         a third set of optical channels comprising optical channels that are configured to pass light associated with respective subranges of a third wavelength range to respective third subsets of sensor elements, of the set of sensor elements, of the optical sensor
      wherein the first set of optical channels includes a first optical channel, a second optical channel, and a third optical channel, and
      wherein the first optical channel is adjacent to the second optical channel and the third optical channel.

12. The optical sensor device of claim 11, wherein:
   the first wavelength range is approximately 600 to 700 nanometers;
   the second wavelength range is approximately 400 to 500 nanometers; and
   the third wavelength range is approximately 500 nanometers to 600 nanometers.

13. The optical sensor device of claim 11, wherein:
   the first set of optical channels is within a first subregion of the region;
   the second set of optical channels is within a second subregion of the region;
   a portion of the third set of optical channels is within a third subregion of the region; and
   another portion of the third set of optical channels is within a fourth subregion of the region.

14. The optical sensor device of claim 11, wherein a subregion of the region comprises:
   a first number of optical channels of the first set of optical channels;
   a first number of optical channels of the second set of optical channels; and
   a second number of optical channels of the third set of optical channels,
   wherein the second number is twice the first number.

15. An optical filter, comprising:
   a plurality of regions, wherein:
      a region, of the plurality of regions, of the optical filter includes:
         a first set of optical channels that are associated with passing light associated with a first wavelength range:
            wherein each optical channel of the first set of optical channels is configured to pass light associated with a particular subrange of the first wavelength range, wherein the first set of optical channels includes a first optical channel, a second optical channel, and a third optical channel, and
wherein the first optical channel is adjacent to the second optical channel and the third optical channel;
a second set of optical channels that are associated with passing light associated with a second wavelength range,
wherein each optical channel of the second set of optical channels is configured to pass light associated with a particular subrange of the second wavelength range; and
a third set of optical channels that are associated with passing light associated with a third wavelength range,
wherein each optical channel of the third set of optical channels is configured to pass light associated with a particular subrange of the third wavelength range.

16. The optical filter of claim 15, wherein:
a number of optical channels included in the first set of optical channels is equal to a number of optical channels included in the second set of optical channels; and
a number of optical channels included in the third set of optical channels is equal to a sum of the number of optical channels included in the first set of optical channels and the number of optical channels included in the second set of optical channels.

17. The optical filter of claim 15, wherein:
the first wavelength range is associated with red light;
the second wavelength range is associated with blue light; and
the third wavelength range is associated with green light.

18. The optical filter of claim 15, wherein:
the first set of optical channels is within a first subregion of the region;
the second set of optical channels is within a second subregion of the region;
a portion of the third set of optical channels is within a third subregion of the region; and
another portion of the third set of optical channels is within a fourth subregion of the region.

19. The optical filter of claim 15, wherein the region comprises a plurality of subregions, wherein:
at least one optical channel of the first set of optical channels is within each of the plurality of subregions;
at least one optical channel of the second set of optical channels is within each of the plurality of subregions; and
at least two optical channels of the third set of optical channels are within each of the plurality of subregions.

20. The optical filter of claim 15, wherein the region comprises a subregion that includes:
one optical channel of the first set of optical channels;
one optical channel of the second set of optical channels; and
two optical channels of the third set of optical channels.

* * * * *